(12) United States Patent
Schulz

(10) Patent No.: US 6,959,374 B2
(45) Date of Patent: Oct. 25, 2005

(54) SYSTEM INCLUDING A MEMORY CONTROLLER CONFIGURED TO PERFORM PRE-FETCH OPERATIONS INCLUDING DYNAMIC PRE-FETCH CONTROL

(75) Inventor: Jurgen Schulz, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 284 days.

(21) Appl. No.: 10/353,892

(22) Filed: Jan. 29, 2003

(65) Prior Publication Data

US 2004/0148470 A1 Jul. 29, 2004

(51) Int. Cl.⁷ .............................................. G06F 12/02
(52) U.S. Cl. ...................................................... 711/213
(58) Field of Search ............................... 711/137, 138, 711/139, 213

(56) References Cited

U.S. PATENT DOCUMENTS

| | | | |
|---|---|---|---|
| 6,233,645 B1 * | 5/2001 | Chrysos et al. ............. | 710/244 |
| 6,636,945 B2 | 10/2003 | Nakamura | |
| 6,687,794 B2 | 2/2004 | Malik | |
| 6,701,316 B1 * | 3/2004 | Li et al. | |
| 6,742,085 B2 | 5/2004 | Hill et al. | |
| 2004/0221111 A1 | 11/2004 | Phelps et al. | |

\* cited by examiner

*Primary Examiner*—Kevin L. Ellis
(74) *Attorney, Agent, or Firm*—Meyertons Hood Kivlin Kowert & Goetzel, P.C.; B. Noël Kivlin; Stephen J. Curran (57) ABSTRACT

A system including a memory controller conf figured to perform pre-fetch operations including dynamic pre-fetch control. The system includes a memory coupled to a memory controller. The memory controller may be configured to fetch data from the memory in response to memory read requests. Further, the memory controller may be configured to dynamically adjust pre-fetching of data from the system memory dependent upon a bandwidth utilization of the memory.

25 Claims, 4 Drawing Sheets

SYSTEM INCLUDING A MEMORY CONTROLLER CONFIGURED TO PERFORM PRE-FETCH OPERATIONS INCLUDING DYNAMIC PRE-FETCH CONTROL

BACKGROUND OF THE INVENTION

1. Field of the Invention

This invention relates to computer system memory and, more particularly, to pre-fetching of data.

2. Description of the Related Art

To improve computer system performance, many computer system processors employ some level of caching to reduce the latency associated with the time it takes for system memory to return data requested by the processor. A typical cache memory is a high-speed memory unit interposed in the memory hierarchy of a computer system between a slower system memory and a processor. A cache typically stores recently used data to improve effective memory transfer rates to thereby improve system performance. The cache is usually implemented in semiconductor memory devices having speeds that are comparable to the speed of the processor, while the system memory utilizes a less costly, lower speed technology. For example, system memories may use some form of dynamic random access memory (DRAM), while cache memories may use some form of static random access memory (SRAM).

A cache memory typically includes a plurality of memory locations that each stores a block or a "line" of two or more words. Each line in the cache has associated with it an address tag that is used to uniquely identify the address of the line. The address tags are typically included within a tag array memory device. Additional bits may further be stored for each line along with the address tag to identify the coherency state of the line.

A processor may read from or write directly into one or more lines in the cache if the lines are present in the cache and if the coherency state allows the access. For example, when a read request originates in the processor for a new word, whether data or instruction, an address tag comparison is made to determine whether a valid copy of the requested word resides in a line of the cache memory. If the line is present, a cache "hit" has occurred and the data is used directly from the cache. If the line is not present, a cache "miss" has occurred and a line containing the requested word is retrieved from the system memory and may be stored in the cache memory. The requested line is simultaneously supplied to the processor to satisfy the request.

Similarly, when the processor generates a write request, an address tag comparison is made to determine whether the line into which data is to be written resides in the cache. If the line is present, the data may be written directly into the cache (assuming the coherency state for the line allows for such modification). If the line does not exist in the cache, a line corresponding to the address being written may be allocated within the cache, and the data may be written into the allocated line.

Some processors may employ one or more levels of cache such as L1, L2 and even L3 cache. Depending on the type of cache, it may be either internal or external to the processor.

To further improve cache performance, many systems use data pre-fetching. In many cases a read request may result in further read requests to addresses sequential to the first address. Thus, pre-fetching typically refers to performing read cycles to a number of sequential addresses in memory and storing the cache lines of data within the cache. These read cycles are typically in addition to performing the first read cycle to a first address. Thus, a subsequent read request to one of the pre-fetched addresses will result in a cache hit. However, depending on the configuration of the system memory and the bandwidth limitations of the memory bus and associated hardware, some pre-fetching arrangements may not be desirable.

SUMMARY OF THE INVENTION

Various embodiments of a system including a memory controller configured to perform pre-fetch operations including dynamic pre-fetch control are disclosed. In one embodiment, a system includes a memory coupled to a memory controller. The memory controller may be configured to fetch data from the memory in response to memory read requests. Further, the memory controller may be configured to dynamically adjust pre-fetching of data from the memory dependent upon a bandwidth utilization of the memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
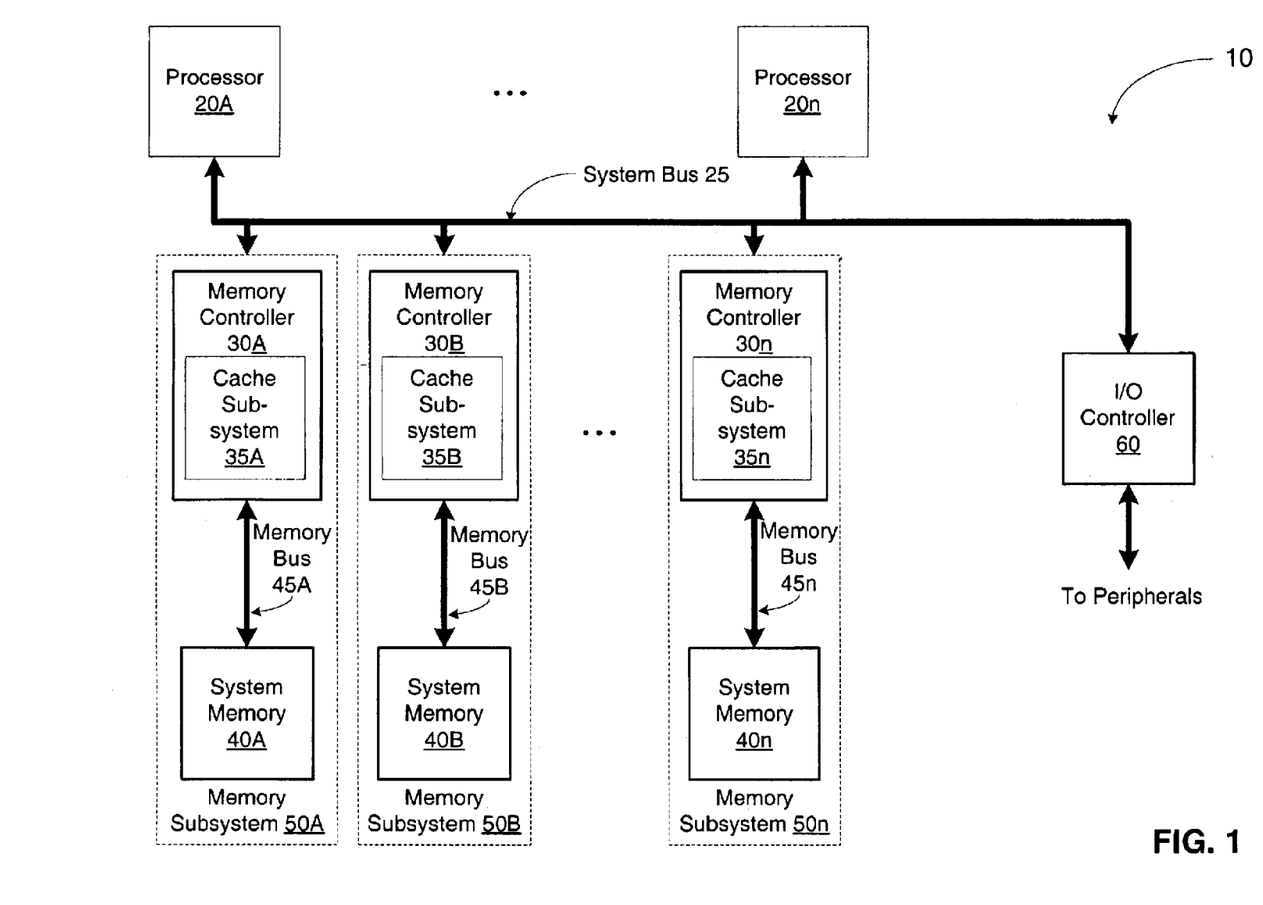
FIG. 1 is a block diagram of one embodiment of a multiprocessor computer system.

Turning now to FIG. 1, a block diagram of one embodiment of a multiprocessor computer system 10 is shown. Computer system 10 includes processors 20A and 20n coupled to memory subsystems 50, 50B and 50n via system bus 25. Each of memory subsystems 50A, 50B and 50n includes a memory controller 30A, 30B and 30n coupled to a system memory 40A, 40B and 40n via a memory bus 45A, 45B and 45n, respectively. Computer system 10 further includes an I/O controller 60 coupled to system bus 25. I/O controller may also be coupled to other I/O peripheral devices (not shown). It is noted that, n represents any number of devices. Thus, any number of processors are contemplated. Similarly, any number of memory controllers may be used with any number of system memory units. Elements referred to herein with a particular reference number followed by a letter may be collectively referred to by the reference number alone. For example, processors 20A-n may be collectively referred to as processor 20. It is further noted that although one memory controller is shown in a given memory subsystem, other embodiments are contemplated in which more than one memory controller may be implemented in a memory subsystem.

Processor 20 is illustrative of an UltraSPARC™ microprocessor such as an UltraSPARC™ 5 microprocessor by Sun Microsystems, Inc. It is contemplated however, that in other embodiments, other processors may be used.

System bus 25 may be any type of system network or system interconnect used for conveying address and data information between system components such as processor 20 and memory subsystem 50. For example, in one embodiment, system bus 25 may be a common shared bus implementation.

In another embodiment, system bus 25 may be implemented such that the data and address may be conveyed over separate portions of the network. In such an embodiment, system bus 25 may have an address network and a data network. The data network may convey the data over a point-to-point network, which may be switched. On the other hand, the address network may convey address information over a broadcast network in which address transactions are conveyed to all components. The address network of system bus 25 may be embodied physically using a point-to-point network, which may include switches. Both the address and data networks of system bus 25 may be implemented using a multi-stage switching hierarchy. System bus 25 may be implemented such that the address network is embodied in hardware that is separate from data network, or in hardware that is shared with the data network.

System memory 40 is configured to store data and instruction code for use by processor 20 and/or I/O controller 60. It is noted that in one embodiment, system memory 40 may be implemented using one or more memory modules such as a dual in-line memory module (DIMM) for example. In such an embodiment, each DIMM may employ a plurality of volatile memory storage units such as dynamic random access memory (DRAM) or synchronous dynamic random access memory (SDRAM) chips, for example. Although it is contemplated that other types of memory may be used. Typically, each DIMM may be mated to a system memory board via an edge connector and socket arrangement. The socket may be located on a memory subsystem circuit board and each DIMM may have an edge connector which may be inserted into the socket, for example.

Generally speaking, processor 20 may access system memory 40 by initiating a memory request such as a memory read or a memory write to memory controller 30 via system bus 25. Memory controller 30 may then control the storing to and retrieval of data from system memory 40 by scheduling and issuing memory requests to system memory 40 via memory bus 35. Further, memory controller 30A through 30n may control data storage by interleaving data across one or more system memories and thus possibly increasing bandwidth performance of the overall memory subsystems. In the illustrated embodiment, a memory request may include address information, data and metadata. Meta data may include coherency information associated with a particular cache line of data such as ownership and sharing information, for example.

In the illustrated embodiment, memory controller 30 includes a cache subsystem 35. It is noted that in other embodiments, memory controller 30 may include other suitable numbers of cache subsystems as necessary. As will be described further below in conjunction with the description of FIG. 2, each of cache subsystems 35A–B may include a cache memory (not shown in FIG. 1) for storing cacheable data. Further, each cache subsystem may be accessed by any of the processors.

Figure 2:
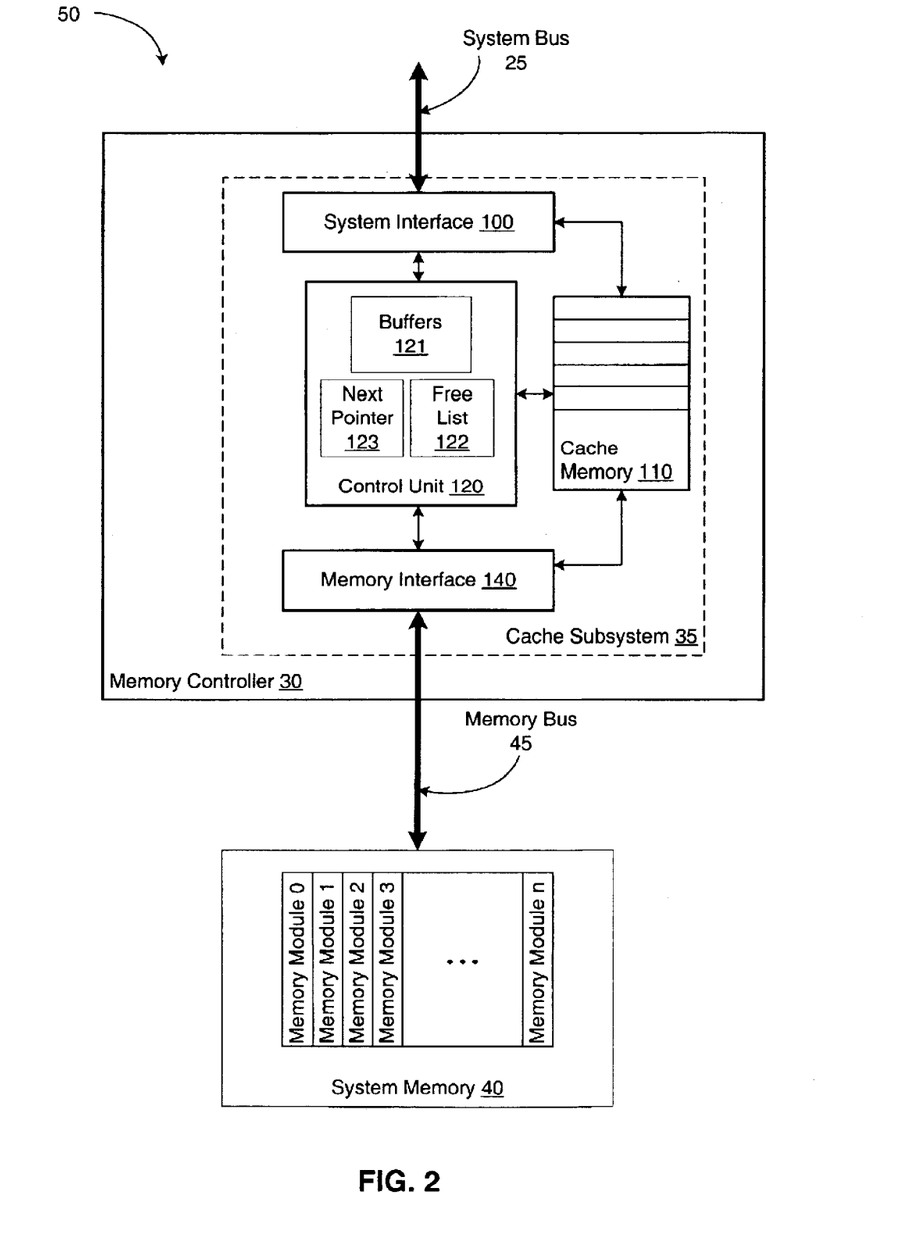
FIG. 2 is a diagram of one embodiment of a memory subsystem including a data cache.

Referring to FIG. 2, a block diagram of one embodiment of a memory subsystem 50 is shown. Circuit components that correspond to components shown in FIG. 1 are numbered identically for clarity and simplicity. Memory subsystem 50 includes a memory controller 30 including a cache subsystem 35, coupled to a system memory 40 via a memory bus 45.

In the illustrated embodiment, system memory 40 includes a plurality of memory modules, designated memory module 0 through n. As mentioned above, each of memory modules 0 through n may be a dual in-line memory module (DIMM). Further, each DIMM may include one or more integrated circuit chips having volatile memory such as RAM or DRAM chips, for example. In one particular implementation, the DIMM may include double data rate synchronous DRAM, or DDRSDRAM. However, other types of DRAM are contemplated. Each DIMM may be divided logically into two or more banks, while each memory chip may include one or more internal banks.

Cache subsystem 35 of memory controller 30 includes a system interface 100 which is coupled to system bus 25 and a memory interface 140 which is coupled to a memory bus 45. Cache subsystem 35 also includes a cache memory 110 which is coupled between system interface 100 and memory interface 140. Cache memory 110 is also coupled to a control unit 120. It is noted that in one embodiment, memory controller 30 may be implemented on an integrated circuit and that cache memory 110 may be implemented on the same integrated circuit as memory controller 30. In an alternative embodiment, cache memory 110 may be implemented on a different integrated circuit than memory controller 30.

System interface 100 is configured to receive incoming memory requests from system bus 25 and to control the return of data to system bus 25. System interface 100 may include arbitration logic (not shown) which selects one request by control unit 120 to return address and data from a number of pending requests.

Cache memory 110 is a storage unit that includes a plurality of storage locations. Each location may store a cache line of data. In one embodiment, cache memory 110 is a fully associative cache in which any location may store any cache line of data. Although it is noted that other embodiments are contemplated in which cache memory 110 may be implemented as a set associative cache. As described further below, each location of cache memory 110 may be indexed by an identification number of a storage buffer of control unit 120.

Control unit 120 controls the flow of memory requests to system memory 40 and the return of data from system memory 40. In one implementation, control unit 120 may include a plurality of storage buffers 121, each one storing information associated with a cache line of data. The information may be referred to as metadata. The metadata may include coherency information such as ownership and sharer information. Thus, cache memory 110 may store the cache line data and the storage buffers within control unit 120 may store the metadata. Each storage buffer 121 may have an identifier which may be used as an index into each location within cache memory 110.

Control unit 120 is configured to determine whether data associated with a memory request is already stored within cache memory 110. For example, if a read request is received, tag-matching logic within control unit 120 (not shown) may determine if the data associated with the requested address is already stored within cache memory 110 by comparing the incoming address to an address tag. If the data is stored within cache memory 110, a cache hit is signaled and a read request may not be triggered within memory interface 140 to system memory 40. Instead, the corresponding cache line data stored within cache memory 110 may be returned. Alternatively, if the data is not stored within cache memory 110, a cache miss is signaled and control unit 120 may cause memory interface 140 to generate a read request to system memory 40. The data returned by system memory 40 may then be stored within cache memory 110 and also returned to system interface 100 where it may be forwarded to the requesting device.

If a write request is received, and there is a cache miss, a storage buffer 121 within control unit 120 is allocated and the cache line data is stored in a corresponding indexed location within cache memory 110. The cache line data may be subsequently written into system memory 40. In one implementation, the cache line data may be written into system memory 40 when the storage buffer 121 within control unit 120 becomes free (i.e. if there are no pending requests to the same address present within a FIFO buffer corresponding to that address). If there are other write requests pending, control unit 120 may save the pending writes locally and then update system memory 40 with the last values.

Depending on the type of volatile memory used in system memory 40, there may be penalties associated with switching between reading and writing data to system memory 40. Thus in one embodiment, memory interface 140 may allow a predetermined number of write requests to be queued before granting the write requests and actually writing the data back to system memory 40. In such an embodiment, the writes may be sent in a burst, thus reducing switching between reads and writes. In another embodiment, memory interface 140 may monitor the utilization of memory bus 45 and wait a predetermined number of cycles before granting write requests and allowing data to be written back to system memory 40 dependent on the utilization of memory bus 45.

Control unit 120 is configured to allocate locations within cache memory 110 and their corresponding storage buffers 121 within control unit 120 as requests are received based upon a free list 122 and a next pointer 123. In one implementation, if a request is received and a cache miss is signaled, control unit 120 will allocate the storage buffer 121 and a corresponding location within cache memory 110 pointed to by next pointer 123. Once a cache line is stored within cache memory 110, any future requests to that same address may be stored in a FIFO buffer (not shown) within cache control unit 120 for subsequent processing. A given location in cache memory 110 and the corresponding buffer within control unit 120 may be reallocated or victimized when its status becomes free based upon an allocation algorithm. To have a free status, there may not be any pending requests in the FIFO buffer directed to the address of the cache line currently being stored. Thus, free list 122 may keep track of all storage buffers and corresponding locations which are not currently allocated. It is noted that in one embodiment, although a location may be free, it may still contain a valid cache line. In such an embodiment, if a subsequent request to the address of the cache line currently being stored is received after the location becomes free but prior to the location being reallocated, that location may be removed from free list 122 and the pending request is stored in the FIFO buffer.

It is noted that in one embodiment, the allocation algorithm may use a pseudo-random scheme to select for victimization the next free storage buffer of storage buffers 121 and corresponding location within cache memory 110. In such an embodiment, control unit 120 may use the storage buffer identification number mentioned above. The algorithm may pass an allocation token among all the storage buffers 121. The token may start at zero and may be passed to the storage buffer that is next to the storage buffer currently being pointed to by the next pointer. Since storage buffers 121 may become free randomly, there is a chance that a just freed storage buffer may be allocated again, depending on the current token position.

However in an alternative embodiment, the allocation algorithm may select for victimization the next free storage buffer based upon the transaction type, since certain transactions have a higher likelihood of having a subsequent request for the same data at a given address. For example, there may be a much higher likelihood of cache line data associated with certain read transactions being subsequently read than certain cache line data which was just written.

Memory interface 140 controls the flow of data between memory controller 30 and system memory 40. Memory interface 140 may include request buffers (not shown) which allow pending read and write requests to be stored. Memory interface 140 may further include circuitry (not shown) which receives read requests and determines whether a read command is issued onto memory bus 45 to system memory 40. Further, memory interface 140 may include arbitration logic (not shown) which may select one write request by control unit 120 from a number of pending requests to write data to system memory 40.

It is noted that a given read or write request to system memory 40 may originate from any processor or I/O controller that may be coupled to system bus 25. Thus, if the data associated with the given read or write request is cacheable, cache subsystem 35 may cache the data.

Figure 3:
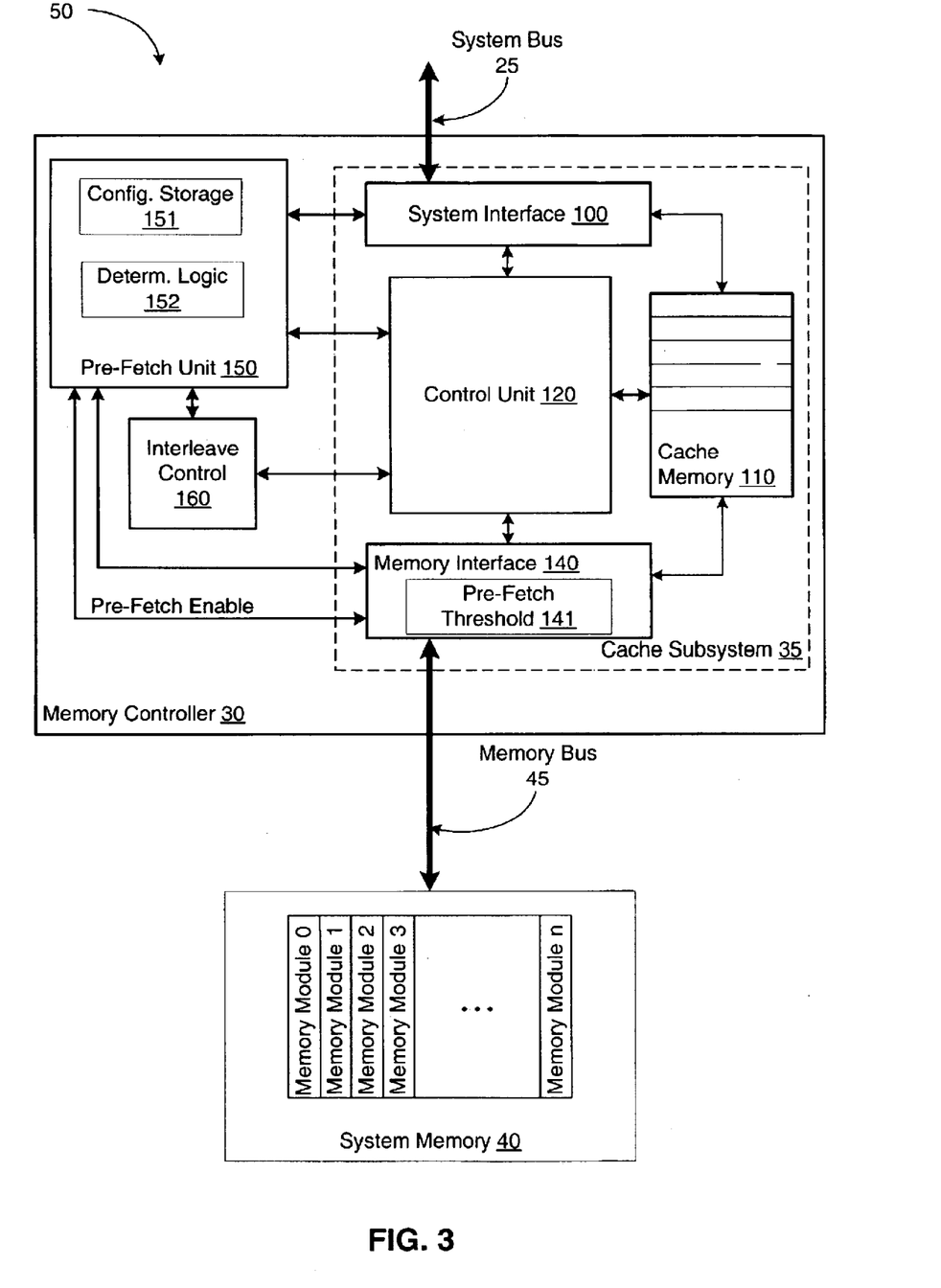
FIG. 3 is a diagram of one embodiment of a memory subsystem including cache data pre-fetching.

Turning to FIG. 3, a block diagram of another embodiment of a memory subsystem is shown. Circuit components that correspond to components shown in FIG. 1 are numbered identically for clarity and simplicity. Memory subsystem 50 includes a memory controller 30 including a cache subsystem 35, a pre-fetch unit 150 and an interleave control 160. Memory controller 30 is coupled to a system memory 40 via a memory bus 45.

As described above in conjunction with the description of FIG. 2, cache subsystem 35 of memory controller 30 includes a system interface 100 which is coupled to system bus 25 and a memory interface 140 which is coupled to a memory bus 45. Cache subsystem 35 also includes a cache memory 110 which is coupled between system interface 100 and memory interface 140. Cache memory 110 is also coupled to a control unit 120. It is noted that in one embodiment, memory controller 30 may be implemented on an integrated circuit and that cache memory 110 may be implemented on the same integrated circuit as memory controller 30. In an alternative embodiment, cache memory 110 may be implemented on a different integrated circuit than memory controller 30.

As described above, system memory 40 includes a plurality of memory modules, labeled memory module 0 through n. As mentioned above, each of memory module 0 through n may be a dual in-line memory module (DIMM). Further, each DIMM may include one or more integrated circuit chips having volatile memory such as RAM or DRAM chips, for example. In one embodiment, the DIMMs on each of memory modules 0-n may be logically arranged into one or more banks. Further, each memory chip may have one or more internal banks.

Pre-fetch unit 150 is coupled to control unit 120, system interface 100 and memory interface 140 of cache subsystem 35. Pre-fetch unit 150 includes a configuration storage 151 such as a register, for example and a determination logic 152. Generally speaking, pre-fetch unit 150 controls whether data is pre-fetched into cache memory 110 and if so how much data is pre-fetched (i.e. how many cache lines). As described above, pre-fetching data into a cache may include performing a number of read cycles to system memory 40 and storing the corresponding data into cache memory 110.

Configuration storage 151 may include a number of programmable locations that when selected may control both the number of pre-fetch read cycles that may be performed and the addresses that may be pre-fetched. For example, configuration storage 151 may include programmable values representing configuration values n−1, n+1, n+2, etc. If pre-fetching is enabled for a read to a current memory request to a given address n, depending on which values are selected, configuration storage 151 may be configured to cause cache subsystem 35 to perform read cycles to n−1, n+1, n+2 or n+m addresses. Where m is any number of address locations. As used herein, a pre-fetch read cycle means that a cache line of data is read out of memory and stored within cache memory 110 and is not returned to the requesting device during that memory read cycle. It is noted that in other embodiments, the configuration values described above may be stored in other types storages such as a look-up table or other memory storage, for example.

As will be described in greater detail below, determination logic 152 is configured to determine whether an incoming read request to a given address will cause cache subsystem 35 to return data associated with the read request to a requesting device or if the read request will generate one or more pre-fetch read cycles. In one embodiment, determination logic 152 may include comparison logic (not shown), which compares an incoming address to the range of addresses allocated to the system memory 40. It is noted that a given received read request may generate a read request and any number of pre-fetch read requests.

Memory interface 140 may dynamically adjust prefetching based upon the utilization of system memory 40. In one embodiment, memory interface 140 may provide a pre-fetch enable signal to pre-fetch unit 150 dependent upon the utilization of the bandwidth of system memory 40. Thus in one embodiment, memory interface 140 may include logic (not shown) which predicts the bandwidth utilization depending upon the number of outstanding memory requests to a given bank of memory. Memory interface 140 may compare the combined number of outstanding read and write requests to a predetermined threshold value stored within a programmable pre-fetch threshold register 141 of memory interface 140. The programmable threshold value may correspond to a maximum number of outstanding read and write requests. If the number of outstanding read and write requests is greater than the threshold value, memory interface 140 may disable pre-fetching by de-asserting the pre-fetch enable signal. When the number of outstanding read and write requests falls below the threshold value, memory interface 140 may enable pre-fetching by asserting the pre-fetch enable signal. Thus, memory interface 140 may dynamically adjust prefetching of the memory 40 based upon a predicted utilization of system memory 40 using the outstanding memory requests.

In an alternative embodiment, memory interface 140 may dynamically adjust prefetching of the memory 40 by determining the bandwidth utilization of system memory 45. Memory interface 140 may include logic (not shown) which monitors memory bus 45 and determines the bandwidth utilization. For example, in one embodiment, the utilization may be calculated as a ratio of data packets to bus cycles. This ratio value may then be compared to a predetermined threshold value stored within pre-fetch threshold register 141. If the utilization ratio exceeds the threshold value, memory interface 140 may disable pre-fetching as above, until the bandwidth utilization falls below the threshold value. Thus, in such an embodiment, memory interface 140 may dynamically adjust prefetching of the memory 40 based upon determining the utilization of system memory 40 using the ratio values.

It is noted that in the embodiments described above, pre-fetch threshold register 141 may be programmed with a given threshold value during an initialization of memory controller 30. Alternatively, the value within pre-fetch threshold register 141 may be dynamically changed dependent upon other factors. For example, in one embodiment, read data latency logic (not shown) within memory controller 30 may be implemented to track the latency of read data being returned by system memory 40 in response to receiving a read request. Thus, if the latency reaches a latency threshold, read data latency logic may change the value stored within pre-fetch threshold register 141, thereby causing pre-fetching to be enabled and disabled in response to changes in read data latency. It is noted that in other various embodiments, it is contemplated that pre-fetch threshold register 141 may be modified in response to other parameters which may be monitored using other logic.

In another embodiment, pre-fetch unit 150 may dynamically adjust prefetching of the memory 40 by increasing or decreasing the number of pre-fetch cycles performed (i.e. the level of pre-fetching), based upon such factors as the utilization of system memory 40. In such an embodiment, pre-fetch unit 150 may modify the configuration values within configuration storage 151, or alternatively select different ones of the values stored within configuration storage 151, thereby resulting in more or less addresses being pre-fetched for a given memory request. For example, in one implementation, memory interface 140 may provide utilization values (e.g. utilization ratio values as described above) to pre-fetch unit 150. Pre-fetch unit 150 may correlate those utilization values to index values which may be used to select the values stored within configuration storage 151. It is noted that in embodiments using other types storages to hold configuration values, such as a look-up table or other memory storage, pre-fetch unit 150 may alternatively change an index value which may index into in the look-up table, for example.

Interleave control 160 controls and maps how the entire system memory address range is mapped and allocated across each individual system memory. In one embodiment, interleave control may maintain a list of devices and their corresponding addresses which are mapped to those devices. The list may be implemented using one or more storage types such as volatile or non-volatile memory, for example.

Referring collectively now to FIG. 1 and FIG. 3, processors 20A–20n may be coupled to multiple memory subsystems 50A–50n of FIG. 1. To improve memory subsystem performance, data stored within the system memory may be interleaved across system memories 40A–40n+1. Thus depending on the level of interleaving, sequential addresses may be mapped across various banks of several system memories. In this way, the bandwidth may be spread across multiple memory subsystems.

In the embodiment illustrated in FIG. 1, each memory subsystem includes a system memory controlled by one memory controller. Each system memory has a corresponding cache subsystem. However, it is noted that in other embodiments, each DIMM may be logically divided into two or more banks and each bank may have a corresponding cache subsystem assigned to it. Thus in such embodiments, a given memory controller may include other numbers of cache subsystems.

To illustrate how interleaving may be implemented in one embodiment, a given system memory includes 10 DIMMs and each DIMM includes 16 memory chips. The 16 memory chips may be divided between four external banks, for example. Further, each memory chip may be divided logically into 4 internal banks. Assuming in one implementation, the system includes 8 memory controllers, a full interleave may be 4 internal banks×4 external banks×1 subsystems×8 memory controllers is equal to a 128-way interleave. Thus, if sequential addresses are read (e.g. cache line 0, 1, 2, 3, etc.), instead of reading the same bank or DIMM over and over, the reads may be spread out across the 8 controllers. Thus for example, to perform 129 sequential reads, the first read may be performed from internal bank 0 of external bank 0 of subsystem 0 of memory controller 0 and proceed to internal bank 0 of external bank 0 of subsystem 0 of memory controller 1. The $9^{th}$ read may be performed on internal bank 1 of external bank 0 of subsystem 0 of memory controller 0. The $128^{th}$ read may be performed from internal bank 3 of external bank 3 of subsystem 0 of memory controller 7. The $129^{th}$ read may then be performed from internal bank 0 of external bank 0 of subsystem 0 of memory controller 0. It is noted however, that in other embodiments, other ways of interleaving are possible and contemplated.

Since data may be spread across multiple memory subsystems, each memory controller may control caching and pre-fetching for the addresses mapped to their respective system memories. Thus, a given address may be broadcast to each memory subsystem 50A–50n and each respective pre-fetch unit and cache subsystem may determine whether to return data to the requesting device in response to the current read request or to only perform pre-fetch read cycles.

When pre-fetching is enabled, the address of the current memory request may be used as a base address n. Depending on which bits are selected within configuration storage 151, one or more pre-fetch addresses are calculated by pre-fetch address calculation logic (not shown). For example, if the n+1 and the n+2 bits are selected within configuration storage 151, then there may be two pre-fetch addresses calculated. Thus, both the number of pre-fetch addresses and which pre-fetch addresses may be determined by configuration storage 151.

Depending on the address of the current memory request, performing an n+1 pre-fetch address calculation may result in a carry operation involving carrying the one over many bits. Thus, to reduce the amount of arithmetic carry logic associated with performing n+1 calculations of pre-fetch addresses, certain addresses may cause pre-fetch address calculation logic to perform a subtraction from the base address n instead an n+1 calculation. This subtraction may occur even if configuration storage 151 contains a value indicating that an n+1 calculation would otherwise be performed. To illustrate using a simple example, if a pre-fetch address ends with $10111111_{bin}$, adding one equals $11000000_{bin}$. However, subtracting 15 or $1111_{bin}$ results in $10110000_{bin}$. In another example, if a pre-fetch address ends with $101111111111_{bin}$, adding one equals $110000000000_{bin}$. However, subtracting 255 or $11111111_{bin}$ results in $101100000000_{bin}$. Thus, due to the interleaving of the memory subsystems described above, performing a subtraction during pre-fetch address calculations may be a suitable alternative to performing an n+1 calculation for some pre-fetch addresses.

It is noted that while the dynamic adjustment of pre-fetching has been described in conjunction with a memory controller coupled to a system memory of a computer system, it is contemplated that the memory controller may be coupled to any memory of any type of system.

Figure 4:
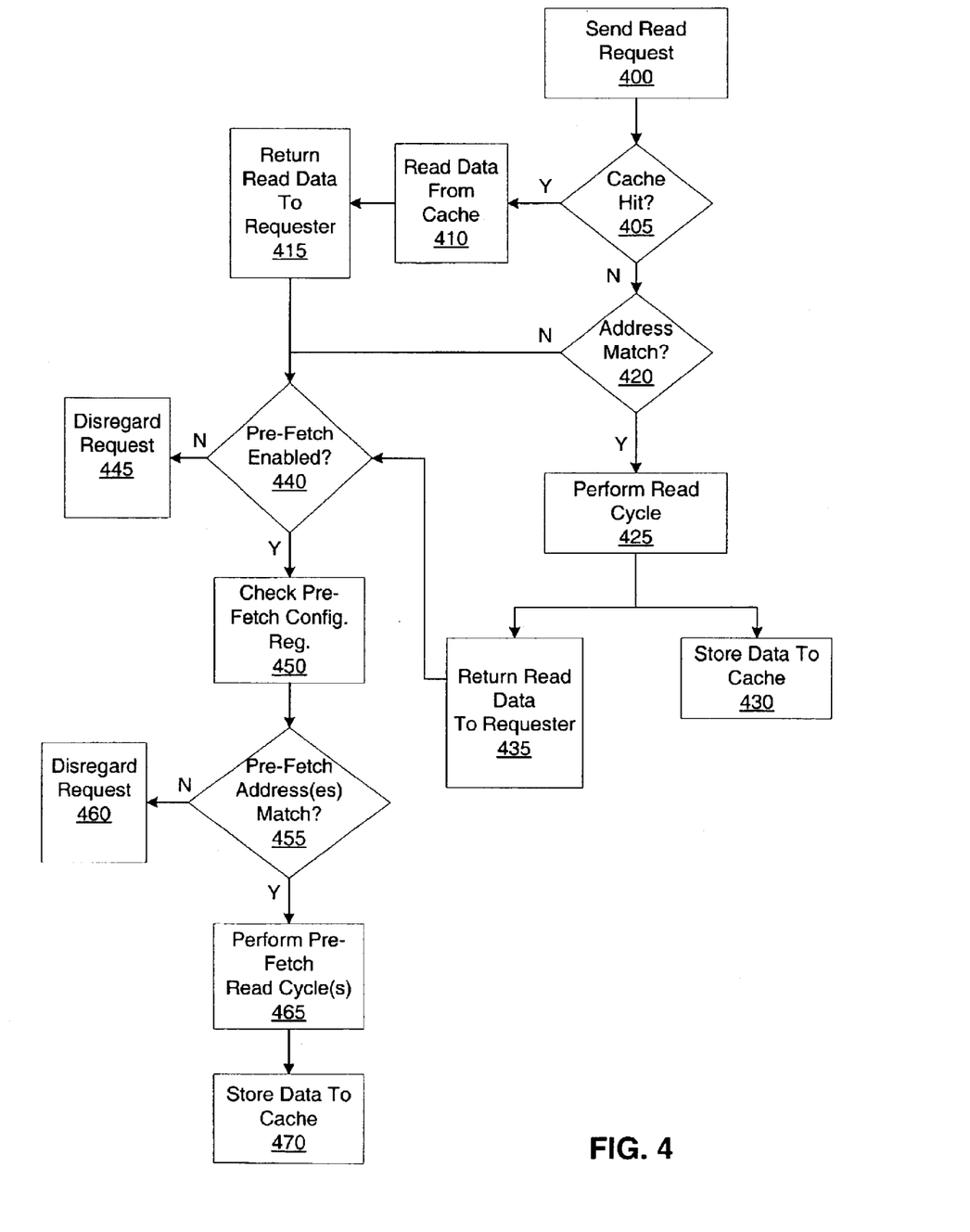
FIG. 4 is a flow diagram describing operation of one embodiment of a memory controller.

Referring to FIG. 4 a flow diagram describing operation of one embodiment of a memory controller is shown. Beginning in block 400, a requesting device such as processor 20A for example, issues a memory read request to a given address. As described above, a cache line of data at a given address may be stored within any of the groups of memory chips or banks within any of the system memories. Thus, the address of the current memory request may be broadcast to each memory subsystem. Control unit 120 of each respective cache subsystem 35 determines whether there is a cache hit (block 405). If there is a cache hit, then the cache line of data is read out of the cache memory 110 (block 410) and returned to requesting processor 20 (block 415).

Referring back to block 405, if there is a cache miss, determination logic 152 within pre-fetch unit 150 determines whether the address is mapped to its respective system memory based upon the upper order address bits (block 420). The upper order address bits may be compared with the address map list maintained by interleave control 160. If determination logic 152 determines that the requested address is mapped to its system memory, then control unit 120 may cause memory interface 140 to perform a read cycle to system memory 40 (block 425). Control unit 120 may also allocate a storage buffer and corresponding location in cache memory 110. When system memory 40 returns the requested data, memory interface 140 provides the data to system interface 100. System interface 100 returns the requested data to requesting processor 20 (block 435). In addition, memory interface 140 provides the data to cache memory 110. Control unit 120 may cause the data to be stored at the previously allocated location within cache memory 110 (block 430).

Referring back to block 420, if determination logic 152 determines that the requested address is not mapped to its system memory, pre-fetch unit 150 checks if pre-fetching is enabled via an enable signal provided by memory interface 140 (block 440). If pre-fetching is not enabled, then the request may be disregarded by that particular memory subsystem (block 445).

If however, pre-fetching is enabled, configuration storage 151 may determine the level of pre-fetching (i.e. how many bits are selected and which values are programmed within configuration storage 151) (block 450). The corresponding pre-fetch address(es) are calculated (e.g. n+1, n+2, n+3, etc.). A selected number of bits (e.g. the low order address bits) of the pre-fetch address(es) are compared to the address map list maintained by interleave control 160 to determine if the pre-fetch address(es) are mapped to that given memory subsystem or system memory (block 455). If the address(es) are not mapped to that given memory subsystem, then the request is disregarded (block 460). On the other hand, if the pre-fetch address(es) are mapped to that memory subsystem, pre-fetch unit 150 may issue a pre-fetch request for each matching pre-fetch address to control unit 120. Control unit 120 allocates a storage buffer and corresponding location within cache memory 110 for each pre-fetch request and issues a corresponding number of pre-fetch read requests to memory interface 140. Memory interface 140 performs pre-fetch read cycles to the respective system memory (block 465). When the respective system memory returns the requested data, control unit 120 may cause the data to be stored at the previously allocated location(s) within cache memory 110 (block 470).

Referring back to both blocks 415 and 435, once the requested read data is returned to requesting processor 20, pre-fetch unit 150 checks a pre-fetch enable signal provided by memory interface 140 (block 440) and operation continues in the manner described above.

Numerous variations and modifications will become apparent to those skilled in the art once the above disclosure is fully appreciated. It is intended that the following claims be interpreted to embrace all such variations and modifications.

What is claimed is:

1. A system comprising:
   a memory;
   a memory controller coupled to said memory and configured to fetch data from said memory in response to memory read requests;
   wherein said memory controller is configured to predict a bandwidth utilization of said memory dependent upon a number of outstanding memory requests; and
   wherein said memory controller is further configured to dynamically adjust pre-fetching of data from said memory dependent upon said bandwidth utilization of said memory.

2. The system as recited in claim 1, wherein said memory controller is further configured to disable pre-fetching said data in response to said number of said outstanding memory requests equaling or exceeding a threshold value stored within a pre-fetch threshold enable storage, wherein said threshold value corresponds to a maximum number of said outstanding memory requests.

3. The system as recited in claim 2, wherein said memory controller is further configured to enable pre-fetching said data in response to said threshold value stored within said pre-fetch threshold enable storage exceeding said number of said outstanding memory requests.

4. The system as recited in claim 3, wherein said memory controller is configured to store said threshold value to said pre-fetch threshold enable storage during an initialization of said memory controller.

5. The system as recited in claim 2, wherein said memory controller is configured to update said threshold value during memory access operations.

6. A system comprising:
   a memory; and
   a memory controller coupled to said memory and configured to fetch data from said memory in response to memory read requests;
   wherein said memory controller is further configured to determine a bandwidth utilization by monitoring memory bus cycles upon a memory bus coupled between said memory controller and said memory and by calculating a ratio of said memory requests to a total number of memory bus cycles;
   wherein said memory controller is further configured to enable and disable pre-fetching said data in response to said threshold value stored within said pre-fetch threshold enable storage exceeding said ratio, and said ratio equaling or exceeding a threshold value stored within a pre-fetch threshold enable storage respectively;
   wherein said memory controller is further configured to dynamically adjust pre-fetching of data from said memory dependent upon said bandwidth utilization of said memory by updating said threshold value during memory access operations.

7. The system as recited in claim 6, wherein said memory controller is configured to store said threshold value to said pre-fetch threshold enable storage during an initialization of said memory controller.

8. A system comprising:
   a memory;
   a memory controller coupled to said memory and configured to fetch data from said memory in response to memory read requests;
   wherein said memory controller is further configured to dynamically adjust pre-fetching of data from said memory dependent upon a bandwidth utilization of said memory;
   wherein said memory controller includes a configuration storage configured to store a plurality of selectable values each representative of a respective pre-fetch address configuration value;
   wherein each of said respective pre-fetch address configuration values represents an offset from an address of a current memory request.

9. The system as recited in claim 8, wherein said memory controller is further configured to pre-fetch a number of selected addresses by selecting one or more of said plurality of selectable values.

10. The system as recited in claim 9, wherein said memory controller is further configured to modify said plurality of selectable values within said configuration storage dependent upon said bandwidth utilization.

11. The system as recited in claim 10, wherein said memory controller is further configured to select different ones of said plurality of selectable values dependent upon said bandwidth utilization.

12. The system as recited in claim 1 further comprising a processor coupled to said memory controller and configured to issue said memory requests.

13. The system as recited in claim 1, wherein said memory controller includes a cache memory subsystem including a cache memory for storing a plurality of cache lines of data.

14. A memory controller comprising:
   a memory interface coupled to a memory and configured to fetch data from said memory in response to memory read requests;
   a pre-fetch unit coupled to said memory interface and configured to pre-fetch said data depending upon an address of a current memory request;
   wherein said memory interface is configured to predict a bandwidth utilization of said memory dependent upon a number of outstanding memory requests; and
   wherein said memory interface is further configured to dynamically adjust pre-fetching of data from said memory dependent upon said bandwidth utilization of said memory.

15. The memory controller as recited in claim 14, wherein said memory interface is further configured to disable pre-fetching said data in response to said number of said outstanding memory requests equaling or exceeding a threshold value corresponding to a maximum number of said outstanding memory requests stored within a pre-fetch threshold enable storage.

16. The memory controller as recited in claim 15, wherein said memory interface is further configured to enable pre-fetching said data in response to said threshold value stored within said pre-fetch threshold enable storage exceeding said number of said outstanding memory requests.

17. The memory controller as recited in claim 16, wherein said memory interface is further configured to provide a pre-fetch enable signal to said pre-fetch unit and to selectively enable and disable pre-fetching by asserting and de-asserting said pre-fetch enable signal, respectively.

18. The memory controller as recited in claim 17, wherein said memory interface is configured to store said threshold value to said pre-fetch threshold enable storage during an initialization of said memory controller.

19. The memory controller as recited in claim 18, wherein said memory interface is configured to update said threshold value during memory access operations.

20. A memory controller comprising:
   a memory interface coupled to a memory and configured to fetch data from said memory in response to memory read requests;
   a pre-fetch unit coupled to said memory interface and configured to pre-fetch said data depending upon an address of a current memory request;
   wherein said memory interface is further configured to dynamically adjust pre-fetching of data from said memory dependent upon a bandwidth utilization of said memory;
   wherein said memory interface is further configured to determine said bandwidth utilization by calculating a ratio of said memory read requests to a total number of memory bus cycles;
   wherein said memory interface is further configured to enable and disable pre-fetching said data in response to said threshold value stored within said pre-fetch threshold enable storage exceeding said ratio, and said ratio equaling or exceeding a threshold value stored within a pre-fetch threshold enable storage, respectively;
   wherein said memory interface is configured to store said threshold value to said pre-fetch threshold enable storage during an initialization of said memory controller.

21. The memory controller as recited in claim 20, wherein said memory interface is further configured to provide a pre-fetch enable signal to said pre-fetch unit and to selectively enable and disable pre-fetching by asserting and de-asserting said pre-fetch enable signal, respectively.

22. The memory controller as recited in claim 20, wherein said memory interface is configured to update said threshold value during memory access operations.

23. A memory controller comprising:
   a memory interface coupled to a memory and configured to fetch data from said memory in response to memory read requests; and
   a pre-fetch unit coupled to said memory interface and configured to pre-fetch said data depending upon an address of a current memory request;
   wherein said memory interface is further configured to dynamically adjust pre-fetching of data from said memory dependent upon a bandwidth utilization of said memory;
   wherein said pre-fetch unit includes a configuration storage configured to store a plurality of selectable values each representative of a respective pre-fetch address configuration value that represents an offset from an address of a current memory request; and
   wherein said pre-fetch unit is further configured to modify said plurality of selectable values within said configuration storage dependent upon said bandwidth utilization.

24. The memory controller as recited in claim 23, wherein said pre-fetch unit is further configured to pre-fetch a number of selected addresses by selecting one or more of said plurality of selectable values.

25. The memory controller as recited in claim 23, wherein said pre-fetch unit is further configured to select different ones of said plurality of selectable values dependent upon said bandwidth utilization.

* * * * *